US010943159B2

(12) United States Patent
Takahashi

(10) Patent No.: US 10,943,159 B2
(45) Date of Patent: Mar. 9, 2021

(54) INFORMATION PROCESSING APPARATUS CONFIGURED TO CALCULATE PREDICTED-NUMBER-OF-DAYS, WHICH IS NUMBER OF DAYS IN AN ALLOWED-NUMBER-OF-MEDIA-TO-BE-FED-AFTER-WEAR-DETECTION IS TO BE CONSUMED, NON-TRANSITORY COMPUTER READABLE RECORDING MEDIUM THAT RECORDS INFORMATION PROCESSING PROGRAM FOR CALCULATING PREDICTED-NUMBER-OF-DAYS, AND INFORMATION PROCESSING METHOD FOR CALCULATING PREDICTED-NUMBER-OF-DAYS

(71) Applicant: KYOCERA DOCUMENT SOLUTIONS INC., Osaka (JP)

(72) Inventor: Minoru Takahashi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/789,531

(22) Filed: Feb. 13, 2020

(65) Prior Publication Data
US 2020/0265277 A1 Aug. 20, 2020

(30) Foreign Application Priority Data
Feb. 14, 2019 (JP) .............................. JP2019-024602

(51) Int. Cl.
*G06K 15/16* (2006.01)
*G06K 15/00* (2006.01)
*G06Q 10/00* (2012.01)

(52) U.S. Cl.
CPC ......... *G06K 15/4025* (2013.01); *G06K 15/16* (2013.01); *G06Q 10/20* (2013.01)

(58) Field of Classification Search
CPC .... G06K 15/4025; G06K 15/16; G06K 15/40; G06Q 10/20
USPC ................... 358/1.9, 3.23; 399/9, 11, 12, 43
See application file for complete search history.

(56) References Cited

U.S. PATENT DOCUMENTS

| 5,802,420 | A | * | 9/1998 | Garr | ..................... | B41J 2/17566 |
| | | | | | | 399/27 |
| 2008/0193147 | A1 | * | 8/2008 | Beard | .................... | G03G 15/55 |
| | | | | | | 399/12 |

FOREIGN PATENT DOCUMENTS

| JP | 2016095543 A | 5/2016 |
| JP | 2018187776 A | 11/2018 |

* cited by examiner

*Primary Examiner* — Jamares Q Washington
(74) *Attorney, Agent, or Firm* — L & Cai Intellectual Property (USA) Office

(57) ABSTRACT

An information processing apparatus includes a controller circuit configured to determine a feed-time-period, calculate a variation-value for each variation-calculation-span, detect that a successive-occurrence-number reaches a successive-occurrence-reference-number, determine a number-of-fed-media-at-wear-detected-time, divide the number-of-fed-media-at-wear-detected-time by a number-of-total-operation-days to calculate an average-number-of-fed-media-per-day, and divide an allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-number-of-media-to-be-fed-after-wear-detection is to be consumed starting from a day on which the successive-occurrence-number reaches the successive-occurrence-reference-number.

6 Claims, 4 Drawing Sheets

INFORMATION PROCESSING APPARATUS CONFIGURED TO CALCULATE PREDICTED-NUMBER-OF-DAYS, WHICH IS NUMBER OF DAYS IN AN ALLOWED-NUMBER-OF-MEDIA-TO-BE-FED-AFTER-WEAR-DETECTION IS TO BE CONSUMED, NON-TRANSITORY COMPUTER READABLE RECORDING MEDIUM THAT RECORDS INFORMATION PROCESSING PROGRAM FOR CALCULATING PREDICTED-NUMBER-OF-DAYS, AND INFORMATION PROCESSING METHOD FOR CALCULATING PREDICTED-NUMBER-OF-DAYS

CROSS-REFERENCE TO RELATED PATENT APPLICATION

This application claims the benefit of Japanese Priority Patent Application JP 2019-024602 filed Feb. 14, 2019, the entire contents of which are incorporated herein by reference.

FIELD OF THE DISCLOSURE

The present disclosure relates to an information processing apparatus configured to determine a timing at which replacement of a part of an image forming apparatus, which feeds media and form images, is required. The present disclosure further relates to a non-transitory computer readable recording medium that records an information processing program, and an information processing method.

BACKGROUND OF THE DISCLOSURE

It is necessary to replace worn parts of an image forming apparatus which feeds media and form images.

SUMMARY OF THE DISCLOSURE

It is desirable to replace parts of an image forming apparatus at appropriate timing.

According to an embodiment of the present disclosure, there is provided an information processing apparatus, including:

a controller circuit configured to determine a feed-time-period, the feed-time-period being a time period in which an image forming apparatus, which feeds media and forms images, feeds one medium, calculate a variation-value for each variation-calculation-span, the variation-calculation-span being a span in which a certain number of media is fed, the variation-value being a standard deviation of the feed-time-periods of the media, detect that a successive-occurrence-number reaches a successive-occurrence-reference-number, the successive-occurrence-number being a number of successive variation-values in each variation-calculation-span that exceeds a variation-reference-value, determine a number-of-fed-media-at-wear-detected-time, the number-of-fed-media-at-wear-detected-time being a number of the fed media from start of operation of the image forming apparatus to a point at which the successive-occurrence-number reaches the successive-occurrence-reference-number, divide the number-of-fed-media-at-wear-detected-time by a number-of-total-operation-days to calculate an average-number-of-fed-media-per-day, the number-of-total-operation-days being a number of days from the start of operation of the image forming apparatus to the point at which the successive-occurrence-number reaches the successive-occurrence-reference-number, and divide an allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-number-of-media-to-be-fed-after-wear-detection is to be consumed starting from a day on which the successive-occurrence-number reaches the successive-occurrence-reference-number.

According to an embodiment of the present disclosure, there is provided a non-transitory computer readable recording medium that records an information processing program executable by a controller circuit of an information processing apparatus, the information processing program causing the controller circuit to determine a feed-time-period, the feed-time-period being a time period in which an image forming apparatus, which feeds media and forms images, feeds one medium, calculate a variation-value for each variation-calculation-span, the variation-calculation-span being a span in which a certain number of media is fed, the variation-value being a standard deviation of the feed-time-periods of the media, detect that a successive-occurrence-number reaches a successive-occurrence-reference-number, the successive-occurrence-number being a number of successive variation-values in each variation-calculation-span that exceeds a variation-reference-value, determine a number-of-fed-media-at-wear-detected-time, the number-of-fed-media-at-wear-detected-time being a number of the fed media from start of operation of the image forming apparatus to a point at which the successive-occurrence-number reaches the successive-occurrence-reference-number, divide the number-of-fed-media-at-wear-detected-time by a number-of-total-operation-days to calculate an average-number-of-fed-media-per-day, the number-of-total-operation-days being a number of days from the start of operation of the image forming apparatus to the point at which the successive-occurrence-number reaches the successive-occurrence-reference-number, and divide an allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-number-of-media-to-be-fed-after-wear-detection is to be consumed starting from a day on which the successive-occurrence-number reaches the successive-occurrence-reference-number.

According to an embodiment of the present disclosure, there is provided an information processing method, including:

determining a feed-time-period, the feed-time-period being a time period in which an image forming apparatus, which feeds media and forms images, feeds one medium;

calculating a variation-value for each variation-calculation-span, the variation-calculation-span being a span in which a certain number of media is fed, the variation-value being a standard deviation of the feed-time-periods of the media;

detecting that a successive-occurrence-number reaches a successive-occurrence-reference-number, the successive-occurrence-number being a number of successive variation-values in each variation-calculation-span that exceeds a variation-reference-value;

determining a number-of-fed-media-at-wear-detected-time, the number-of-fed-media-at-wear-detected-time being a number of the fed media from start of operation of the image forming apparatus to a point at which the successive-occurrence-number reaches the successive-occurrence-reference-number;

dividing the number-of-fed-media-at-wear-detected-time by a number-of-total-operation-days to calculate an average-number-of-fed-media-per-day, the number-of-total-operation-days being a number of days from the start of operation of the image forming apparatus to the point at which the successive-occurrence-number reaches the successive-occurrence-reference-number; and dividing an allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-number-of-media-to-be-fed-after-wear-detection is to be consumed starting from a day on which the successive-occurrence-number reaches the successive-occurrence-reference-number.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings. In the present embodiment described below, an information processing apparatus is an image forming apparatus (for example, MFP, Multifunction Peripheral).

1. Hardware Configuration of Image Forming Apparatus

Figure 1:
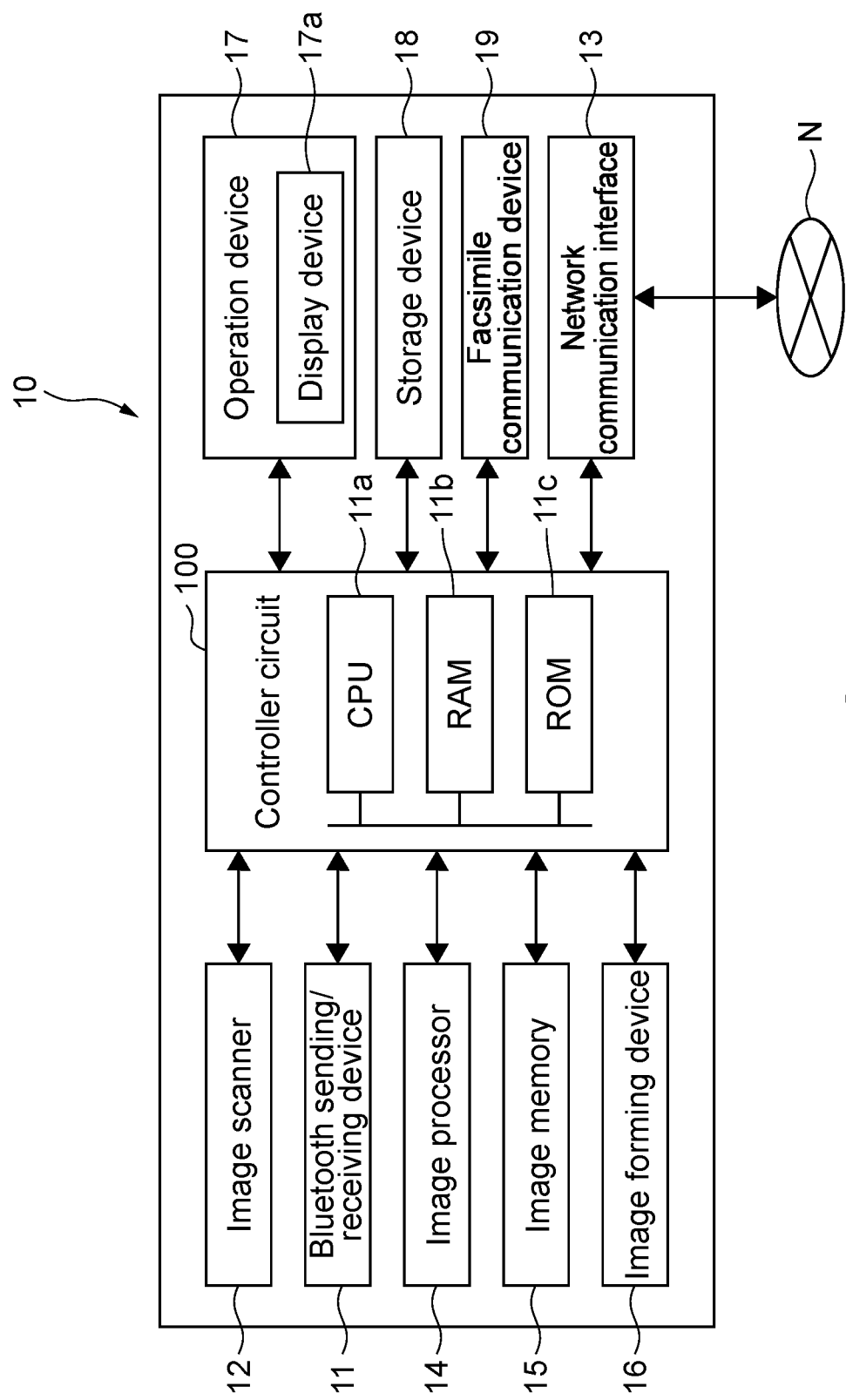
FIG. 1 shows a hardware configuration of an image forming apparatus according to an embodiment of the present disclosure.

FIG. 1 shows a hardware configuration of an image forming apparatus according to an embodiment of the present disclosure.

The image forming apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the image forming apparatus 10. The CPU 11a loads information processing programs stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 100 is connected to the Bluetooth (registered trademark) sending/receiving device 11, the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

2. Functional Configuration of Image Forming Apparatus

Figure 2:
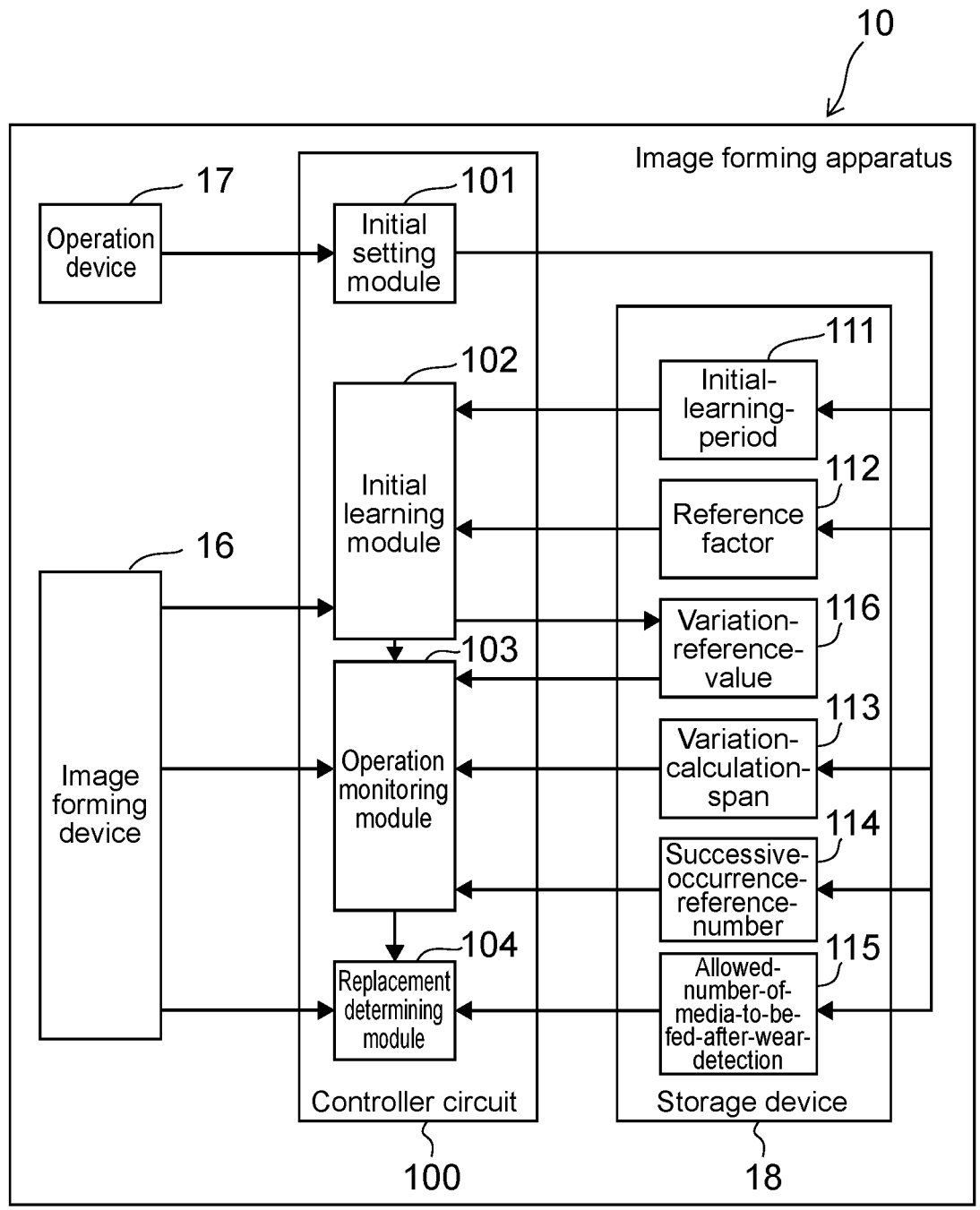
FIG. 2 shows a functional configuration of the image forming apparatus.

FIG. 2 shows a functional configuration of the image forming apparatus.

In the controller circuit 100 of the image forming apparatus 10, the CPU 11a loads an information processing program stored in the ROM 11c in the RAM 11b and executes the information processing program to operate as the initial setting module 101, the initial learning module 102, the operation monitoring module 103, and the replacement determining module 104.

3. Operational Flow of Image Forming Apparatus

Figure 3:
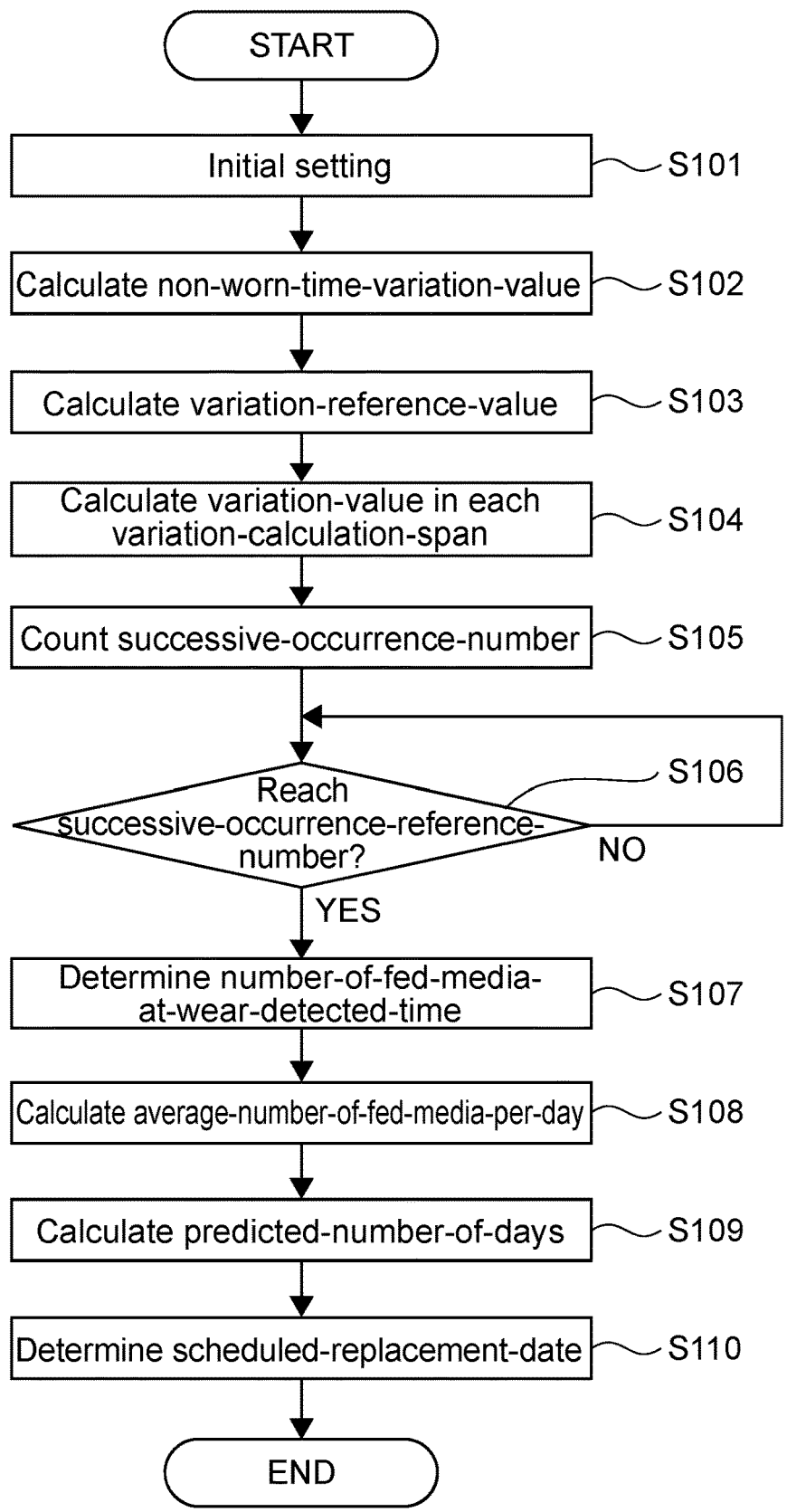
FIG. 3 shows an operational flow of the image forming apparatus.

FIG. 3 shows an operational flow of the image forming apparatus.

The initial setting module 101 sets the initial-learning-period 111, the reference factor 112, the variation-calculation-span 113, the successive-occurrence-reference-number 114, and the allowed-number-of-media-to-be-fed-after-wear-detection 115 on a basis of information input in the operation device 17. The initial setting module 101 stores the initial-learning-period 111, the reference factor 112, the variation-calculation-span 113, the successive-occurrence-reference-number 114, and the allowed-number-of-media-to-be-fed-after-wear-detection 115 in the storage device 18 (Step S101).

The "variation" or "variation-value" is a standard deviation of feed-time-periods, the feed-time-period being a time period in which the image forming apparatus 10 feeds one medium. "The initial-learning-period 111" is a span in which a certain number of media are fed from a certain serial number of a medium from the start of operation of the image forming apparatus 10, and is a span used to easure variations in an initial operation stage. "The reference factor 112" is a factor multiplied by a non-worn-time-variation-value (described below) to obtain a variation-reference-value ("variation-reference-value 116" described below). "The variation-calculation-span 113" is a span in which a certain number of media is fed by the image forming apparatus 10 after the initial-learning-period 111 is finished, and is a span used to calculate a variation-value during operation of the image forming apparatus 10. "The successive-occurrence-reference-number 114" is a reference number (threshold) for a number of successive variation-values in each variation-calculation-span 113 that exceeds a variation-reference-value ("variation-reference-value 116" described below). "The allowed-number-of-media-to-be-fed-after-wear-detection 115" is a number of feedable media from the point at which it is determined that a part of the image forming apparatus 10 may be about to be worn (the successive-occurrence-number reaches the successive-occurrence-reference-number 114) to a point at which a part is replaced actually.

The initial learning module 102 determines every feed-time-period of the image forming device 16, and calculates a non-worn-time-variation-value (Step S102). The "non-worn-time-variation-value" is the variation-value in the initial-learning-period 111, and is a variation-value where a part is not worn. Specifically, the "non-worn-time-variation-value" is a standard deviation of feed-time-periods of media fed in the initial-learning-period 111. The initial learning module 102 multiplies the calculated non-worn-time-variation-value by the reference factor 112 to calculate the variation-reference-value 116, and stores the variation-reference-value 116 in the storage device 18 (Step S103). "The variation-reference-value 116" is a reference value used to determine that a part of the image forming apparatus 10 is about to be worn.

After the initial-learning-period 111 is finished, the operation monitoring module 103 calculates a variation-value in each variation-calculation-span 113 (Step S104). The operation monitoring module 103 monitors whether a variation-value exceeds the variation-reference-value 116 or not. The operation monitoring module 103 counts a number (referred to as successive-occurrence-number) of successive variation-values that exceeds the variation-reference-value 116 (Step S105). The operation monitoring module 103 detects that the successive-occurrence-number reaches the successive-occurrence-reference-number 114 (Step S106, YES). The fact that "the successive-occurrence-number reaches the successive-occurrence-reference-number 114" means that a part of the image forming apparatus 10 may be about to be worn. The operation monitoring module 103 determines a number-of-fed-media-at-wear-detected-time (Step S107). The "number-of-fed-media-at-wear-detected-time" is a number of the fed media from start of operation of the image forming apparatus 10 to a point at which the successive-occurrence-number reaches the successive-occurrence-reference-number 114.

The replacement determining module 104 divides the number-of-fed-media-at-wear-detected-time by a number-of-total-operation-days to calculate an average-number-of-fed-media-per-day (Step S108). The "number-of-total-operation-days" is a number of days from the start of operation of the image forming apparatus 10 to the point at which the successive-occurrence-number reaches the successive-occurrence-reference-number. The replacement determining module 104 divides the allowed-number-of-media-to-be-fed-after-wear-detection 115 by the average-number-of-fed-media-per-day to calculate a predicted-number-of-days (Step S109). The "predicted-number-of-days" is a number of days in which the allowed-number-of-media-to-be-fed-after-wear-detection 115 is to be consumed starting from a day on which the successive-occurrence-number reaches the successive-occurrence-reference-number. The replacement determining module 104 determines a scheduled-replacement-date (or scheduled-replacement-date-and-time) on a basis of the predicted-number-of-days, the scheduled-replacement-date (or scheduled-replacement-date-and-time) being a date (or date-and-time) at which the part is to be replaced (Step S110). Typically, the replacement determining module 104 adds a predicted-number-of-days to the current date (or date-and-time), and determines the resultant value (date or date-and-time) as the scheduled-replacement-date (or scheduled-replacement-date-and-time). The replacement determining module 104 may inform a terminal device (not shown) that a serviceman uses of the determined scheduled-replacement-date via the network N.

4. Specific Example of Operations of Image Forming Apparatus

Figure 4:
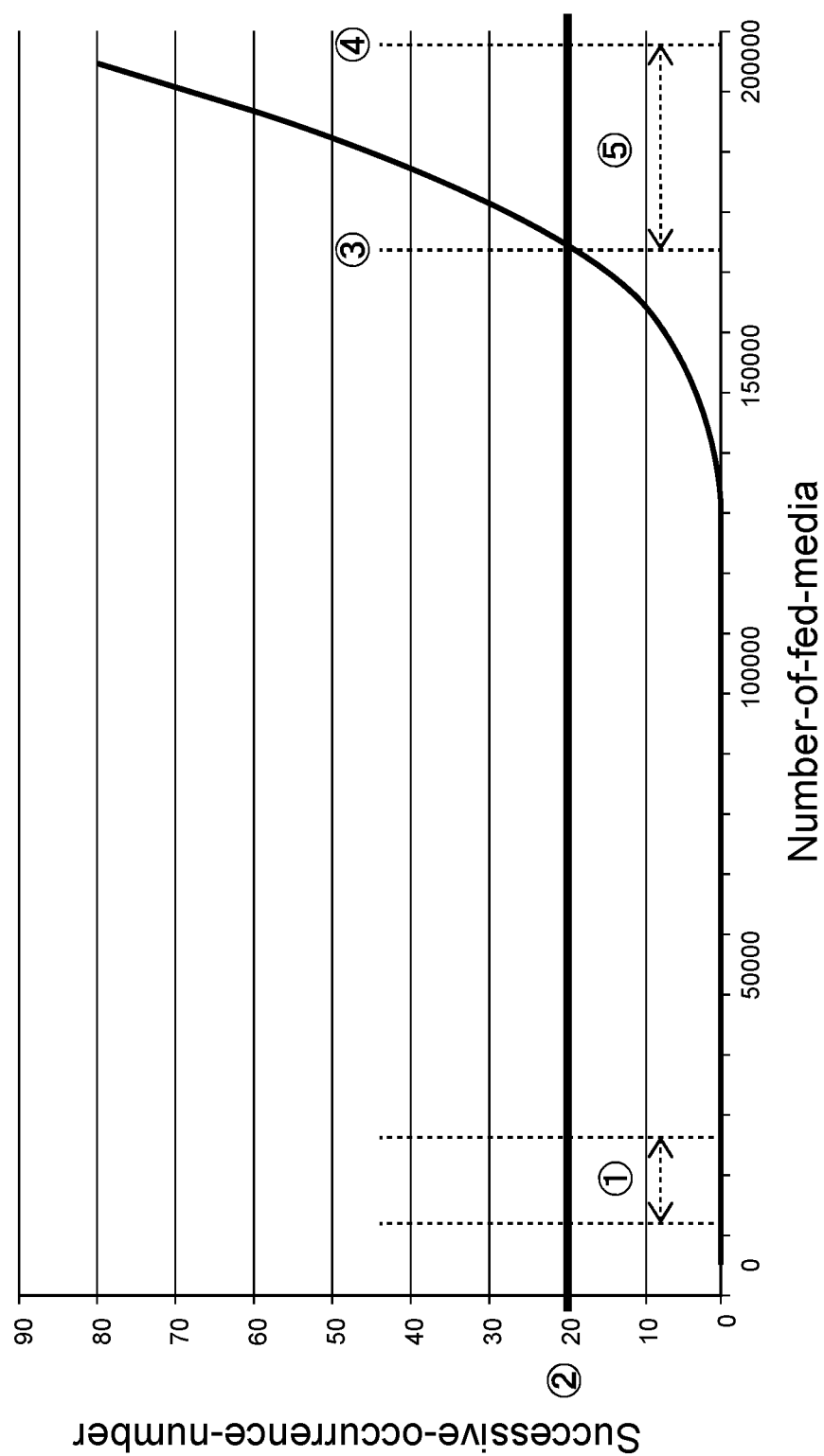
FIG. 4 shows a model illustrating a specific example of operations of the image forming apparatus.

FIG. 4 shows a model illustrating a specific example of operations of the image forming apparatus.

Hereinafter, a specific example of operations of the image forming apparatus 10 will be described with reference to specific values.

The initial setting module 101 sets the initial-learning-period 111, the reference factor 112, the variation-calculation-span 113, the successive-occurrence-reference-number 114, and the allowed-number-of-media-to-be-fed-after-wear-detection 115 as follows. The initial setting module 101 stores the initial-learning-period 111, the reference factor 112, the variation-calculation-span 113, the successive-occurrence-reference-number 114, and the allowed-number-of-media-to-be-fed-after-wear-detection 115 in the storage device 18 (Step S101).

The initial-learning-period 111=1,000-th to 1,999-th media

The reference factor 112=×1.5

The variation-calculation-span 113=1,000 media

The successive-occurrence-reference-number 114=20 times

The allowed-number-of-media-to-be-fed-after-wear-detection 115=20,000 media

The initial learning module 102 calculates a non-worn-time-variation-value (variation-value in the initial-learning-period 111) and the result is "0.1" (Step S102). In FIG. 4, (1) shows the initial-learning-period 111. As indicated by the following expression, the initial learning module 102 multiplies the non-worn-time-variation-value "0.1" by the reference factor 112 "1.5" to calculate the variation-reference-value 116 (Step S103).

The non-worn-time-variation-value=0.1

The variation-reference-value 116=0.1×1.5=0.15

After the initial-learning-period 111 (1,000-th to 1,999-th media) is finished, the operation monitoring module 103 calculates a variation-value in each variation-calculation-span 113 (1,000 media) (Step S104). "Each variation-calculation-span 113 (1,000 media)" means, more specifically, each of 2,000-th to 2,999-th media, 3,000-th to 3,999-th media, 4,000-th to 4,999-th media, and so on. In short, the operation monitoring module 103 calculates a variation-value of 2,000-th to 2,999-th media, a variation-value of 3,000-th to 3,999-th media, a variation-value of 4,000-th to 4,999-th media, and so on.

The operation monitoring module 103 counts a number (successive-occurrence-number) of successive calculated variation-values that exceeds the variation-reference-value 116 "0.15" (Step S105). The operation monitoring module 103 detects that the successive-occurrence-number reaches the successive-occurrence-reference-number 114 "20 times" (Step S106, YES). In FIG. 4, (2) shows the successiveoccurrence-reference-number 114. The operation monitoring module 103 determines the number-of-fed-media-at-wear-detected-time, and the result is "185,000 media" (Step S107). In FIG. 4, (3) shows the number-of-fed-media-at-wear-detected-time "185,000 media". As indicated by the following expression, the replacement determining module 104 divides the number-of-fed-media-at-wear-detected-time "185,000 media" by a number-of-total-operation-days (in this example, "370 days") to calculate an average-number-of-fed-media-per-day (Step S108).

The average-number-of-fed-media-per-day=185,000/370=500 media

In FIG. 4, (5) shows the allowed-number-of-media-to-be-fed-after-wear-detection 115. As indicated by the following expression, the replacement determining module 104 divides the allowed-number-of-media-to-be-fed-after-wear-detection 115 "20,000 media" by the average-number-of-fed-media-per-day "500 media" to calculate a predicted-number-of-days, in which the allowed-number-of-media-to-be-fed-after-wear-detection 115 "20,000 media" is to be consumed (Step S109). The replacement determining module 104 determines a scheduled-replacement-date (or scheduled-replacement-date-and-time) on a basis of the predicted-number-of-days, the scheduled-replacement-date (or scheduled-replacement-date-and-time) being a date (or date-and-time) at which the part is to be replaced (Step S110). For example, the replacement determining module 104 adds a predicted-number-of-days to the current date-and-time (in this example, 25 Dec. 2018, 13:00), and determines the resultant value (date-and-time) as the scheduled-replacement-date (or scheduled-replacement-date-and-time).

The predicted-number-of-days=20,000/500=40 days The scheduled-replacement-date=(25 Dec. 2018, 13:00)+40 days=(3 Feb. 2019, 13:00)

By the way, the replacement determining module 104 may add the allowed-number-of-media-to-be-fed-after-wear-detection 115 "20,000 media" to the number-of-fed-media-at-wear-detected-time "185,000 media" to calculate a replacement-required-number-of-fed-media (185,000+20,000=205,000 media). In FIG. 4, (4) shows the replacement-required-number-of-fed-media. The "replacement-required-number-of-fed-media" is a number of fed media safely feedable at timing at which the part is to be replaced starting from the start of operation of the image forming apparatus 10. Calculation of the replacement-required-number-of-fed-media will help to determine part replacement timings in the future and timings of replacement in other image forming apparatuses 10.

5. Modification Example

In the present embodiment, the image forming apparatus 10 operates as the initial setting module 101, the initial learning module 102, the operation monitoring module 103, and the replacement determining module 104. Instead, an information processing apparatus (not shown) may be connected to the image forming apparatus 10 via or not via a network, receive data such as feed-time-periods from the image forming apparatus 10, and operate as the initial learning module 102, the operation monitoring module 103, and the replacement determining module 104.

6. Conclusion

It is necessary to replace some of the parts of an image forming apparatus depending on their lifetime. According to conceivable timings at which a part is replaced, a part is replaced when a number of fed media reaches a certain number, or a part is replaced regularly (for example, at the time of regular maintenance). However, according to such a method, if a part is worn faster than usual, replacement of the part may be delayed. To the contrary, if a part is worn slower than usual, the part may be replaced earlier than the required timing.

(1) In view of the aforementioned circumstances, according to the present embodiment, the operation monitoring module 103 detects that the successive-occurrence-number reaches the successive-occurrence-reference-number 114, the successive-occurrence-number being a number of successive variation-values (standard deviation in feed-time-period) in each variation-calculation-span that exceeds a variation-reference-value (Step S106, YES). The replacement determining module 104 divides an allowed-number-of-media-to-be-fed-after-wear-detection by the average-number-of-fed-media-per-day to calculate a predicted-number-of-days, the allowed-number-of-media-to-be-fed-after-wear-detection 115 being a number of feedable media from the point at which the successive-occurrence-number reaches the successive-occurrence-reference-number 114 to a point at which a part is replaced, the predicted-number-of-days being a number of days in which the allowed-number-of-media-to-be-fed-after-wear-detection 115 is to be consumed (Step S109). As a result, the replacement determining module 104 is capable of determining a number of days (predicted-number-of-days), at which the part is to be replaced, on a basis of a variation of feed-time-periods which may results from a worn part. As a result, it is possible to replace the part at an appropriate timing depending on the worn part.

(2) According to the present embodiment, the initial learning module 102 calculates a non-worn-time-variation-value, the non-worn-time-variation-value being the variation-value in the initial-learning-period 111 (Step S102), and multiplies the non-worn-time-variation-value by the reference factor 112 to calculate the variation-reference-value 116 (Step S103). As a result, the variation-reference-value 116 is calculated on a basis of the actual non-worn-time-variation-value of the individual image forming apparatus 10. As a result, it is possible to replace the part at a more appropriate timing depending on the worn part.

(3) According to the present embodiment, the replacement determining module 104 determines a scheduled-replacement-date (or scheduled-replacement-date-and-time) on a basis of the predicted-number-of-days, the scheduled-replacement-date (or scheduled-replacement-date-and-time) being a date (or date-and-time) at which the part is to be replaced (Step S110). As a result, it is possible to replace the part at an appropriate timing, i.e., the scheduled-replacement-date.

(4) According to the present embodiment, the replacement determining module 104 may calculate the replacement-required-number-of-fed-media. As a result, it will help to determine part replacement timings in the future and timings of replacement in other image forming apparatuses 10.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an operation device;
a storage device;
a network communication interface; and a controller circuit including a CPU, a ROM storing an information processing program, and a RAM, the CPU being configured to load the information processing program in the RAM and executes the information processing program to thereby
set on a basis of information input in the operation device and store in the storage device, an initial-learning-period, a reference factor, a variation-calculation-span, a successive-occurrence-reference-number, and an allowed-number-of-media-to-be-fed-after-wear-detection, the initial-learning-period being a span in which a certain number of media are fed from a certain serial number of a medium from start of operation of an image forming apparatus,
determine a feed-time-period, the feed-time-period being a time period in which the image forming apparatus, which feeds media and forms images, feeds one medium,
calculate a variation-value for each variation-calculation-span, the variation-calculation-span being a span in which a certain number of media is fed, the variation-value being a standard deviation of the feed-time-periods of the media,
detect that a successive-occurrence-number reaches the successive-occurrence-reference-number, the successive-occurrence-number being a number of successive variation-values in each variation-calculation-span that exceeds a variation-reference-value,
determine a number-of-fed-media-at-wear-detected-time, the number-of-fed-media-at-wear-detected-time being a number of the fed media from start of operation of the image forming apparatus to a point at which the successive-occurrence-number reaches the successive-occurrence-reference-number,
divide the number-of-fed-media-at-wear-detected-time by a number-of-total-operation-days to calculate an average-number-of-fed-media-per-day, the number-of-total-operation-days being a number of days from the start of operation of the image forming apparatus to the point at which the successive-occurrence-number reaches the successive-occurrence-reference-number,
divide the allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-number-of-media-to-be-fed-after-wear-detection is to be consumed starting from a day on which the successive-occurrence-number reaches the successive-occurrence-reference-number,
determine a scheduled-replacement-date on a basis of the predicted-number-of-days, the scheduled-replacement-date being a date at which the part is to be replaced, and
inform a terminal device that a serviceman uses of the determined scheduled-replacement-date via the network communication interface.

2. The information processing apparatus according to claim 1, wherein
the controller circuit is configured to
calculate a non-worn-time-variation-value, the non-worn-time-variation-value being the variation-value in the initial-learning-period, and
multiply the non-worn-time-variation-value by a reference factor to calculate the variation-reference-value.

3. The information processing apparatus according to claim 1, wherein
the controller circuit is configured to
add the allowed-number-of-media-to-be-fed-after-wear-detection to the number-of-fed-media-at-wear-detected-time to calculate a replacement-required-number-of-fed-media, the replacement-required-number-of-fed-media being a number of fed media at timing at which the part is to be replaced starting from the start of operation of the image forming apparatus.

4. The information processing apparatus according to claim 1, further comprising:
the image forming apparatus.

5. A non-transitory computer readable recording medium that records an information processing program executable by a controller circuit of an information processing apparatus, the information processing apparatus including an operation device, a storage device, a network communication interface, and the controller circuit, the information processing program causing the controller circuit to
set on a basis of information input in the operation device and store in the storage device, an initial-learning-period, a reference factor, a variation-calculation-span, a successive-occurrence-reference-number, and an allowed-number-of-media-to-be-fed-after-wear-detection, the initial-learning-period being a span in which a certain number of media are fed from a certain serial number of a medium from start of operation of an image forming apparatus,
determine a feed-time-period, the feed-time-period being a time period in which the image forming apparatus, which feeds media and forms images, feeds one medium,
calculate a variation-value for each variation-calculation-span, the variation-calculation-span being a span in which a certain number of media is fed, the variation-value being a standard deviation of the feed-time-periods of the media,
detect that a successive-occurrence-number reaches the successive-occurrence-reference-number, the successive-occurrence-number being a number of successive variation-values in each variation-calculation-span that exceeds a variation-reference-value,
determine a number-of-fed-media-at-wear-detected-time, the number-of-fed-media-at-wear-detected-time being a number of the fed media from start of operation of the image forming apparatus to a point at which the successive-occurrence-number reaches the successive-occurrence-reference-number,
divide the number-of-fed-media-at-wear-detected-time by a number-of-total-operation-days to calculate an average-number-of-fed-media-per-day, the number-of-total-operation-days being a number of days from the start of operation of the image forming apparatus to the point at which the successive-occurrence-number reaches the successive-occurrence-reference-number,
divide the allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-numberof-media-to-be-fed-after-wear-detection is to be consumed starting from a day on which the successive-occurrence-number reaches the successive-occurrence-reference-number, determine a scheduled-replacement-date on a basis of the predicted-number-of-days, the scheduled-replacement-date being a date at which the part is to be replaced, and inform a terminal device that a serviceman uses of the determined scheduled-replacement-date via the network communication interface.

6. An information processing method for an information processing apparatus including an operation device, a storage device, a network communication interface, and a controller circuit, the information processing method comprising:

setting on a basis of information input in the operation device and storing in the storage device, an initial-learning-period, a reference factor, a variation-calculation-span, a successive-occurrence-reference-number, and an allowed-number-of-media-to-be-fed-after-wear-detection, the initial-learning-period being a span in which a certain number of media are fed from a certain serial number of a medium from start of operation of an image forming apparatus;

determining a feed-time-period, the feed-time-period being a time period in which the image forming apparatus, which feeds media and forms images, feeds one medium;

calculating a variation-value for each variation-calculation-span, the variation-calculation-span being a span in which a certain number of media is fed, the variation-value being a standard deviation of the feed-time-periods of the media;

detecting that a successive-occurrence-number reaches the successive-occurrence-reference-number, the successive-occurrence-number being a number of successive variation-values in each variation-calculation-span that exceeds a variation-reference-value;

determining a number-of-fed-media-at-wear-detected-time, the number-of-fed-media-at-wear-detected-time being a number of the fed media from start of operation of the image forming apparatus to a point at which the successive-occurrence-number reaches the successive-occurrence-reference-number;

dividing the number-of-fed-media-at-wear-detected-time by a number-of-total-operation-days to calculate an average-number-of-fed-media-per-day, the number-of-total-operation-days being a number of days from the start of operation of the image forming apparatus to the point at which the successive-occurrence-number reaches the successive-occurrence-reference-number;

dividing the allowed-number-of-media-to-be-fed-after-wear-detection by the average-number-of-fed-media-per-day to calculate a predicted-number-of-days, the allowed-number-of-media-to-be-fed-after-wear-detection being a number of feedable media from the point at which the successive-occurrence-number reaches the successive-occurrence-reference-number to a point at which a part is replaced, the predicted-number-of-days being a number of days in which the allowed-number-of-media-to-be-fed-after-wear-detection is to be consumed starting from a day on which the successive-occurrence-number reaches the successive-occurrence-reference-number;

determining a scheduled-replacement-date on a basis of the predicted-number-of-days, the scheduled-replacement-date being a date at which the part is to be replaced; and informing a terminal device that a serviceman uses of the determined scheduled-replacement-date via the network communication interface.

* * * * *